USOO9426652B2

(12) United States Patent
Nutaro et al.

(10) Patent No.: US 9,426,652 B2
(45) Date of Patent: Aug. 23, 2016

(54) HIGH ASSURANCE AUTHORIZATION DEVICE

(76) Inventors: Joseph Nutaro, Phoenix, AZ (US); Daniel P. Johnson, Fridley, MN (US); Robert Olson, Phoenix, AZ (US)

(\*) Notice: Subject to any disclaimer, the term of this patent is extended or adjusted under 35 U.S.C. 154(b) by 1101 days.

(21) Appl. No.: 12/915,769

(22) Filed: Oct. 29, 2010

(65) Prior Publication Data
US 2012/0066751 A1    Mar. 15, 2012

Related U.S. Application Data

(60) Provisional application No. 61/381,345, filed on Sep. 9, 2010.

(51) Int. Cl.
| | |
|---|---|
| *G06F 21/00* | (2013.01) |
| *H04W 12/06* | (2009.01) |
| *G06F 21/60* | (2013.01) |
| *G06F 21/64* | (2013.01) |
| *H04L 29/06* | (2006.01) |

(52) U.S. Cl.
CPC ............ *H04W 12/06* (2013.01); *G06F 21/606* (2013.01); *G06F 21/64* (2013.01); *H04L 63/123* (2013.01)

(58) Field of Classification Search
CPC ...... G06F 21/00; G06F 21/34; G06F 21/606; G06F 21/64; H04W 12/06; H04L 63/123
USPC ........ 726/9, 20, 22–25, 27, 6; 713/165, 193, 713/172, 178, 184
See application file for complete search history.

(56) References Cited

U.S. PATENT DOCUMENTS

| | | | |
|---|---|---|---|
| 7,330,981 B2 * | 2/2008 | Willman | ........................ 713/193 |
| 7,734,933 B1 | 6/2010 | Marek et al. | |

(Continued)

FOREIGN PATENT DOCUMENTS

| | | |
|---|---|---|
| EP | 1855439 A2 | 11/2007 |
| WO | 9918493 | 4/1999 |

(Continued)

OTHER PUBLICATIONS

Clark Weissman; MLS-PCA: A High Assurance Security Architecture for Future Avionics; 2003 IEEE; IEEE Computer Society; Northrop Grumman Corporation, 11 pages.*

(Continued)

*Primary Examiner* — Thanhnga B Truong
(74) *Attorney, Agent, or Firm* — Fogg & Powers LLC

(57) ABSTRACT

Methods and apparatus are provided for securing the transfer of data over the internet from malicious interference. The apparatus comprises a computing device and a data storage device in operable communication with the computing device. The apparatus also includes a set of high assurance security instructions resident on the data storage device and executing within the computing device and at least one input/output interface. The method comprises receiving data via a first communication interface and storing the data in a memory device and initiating an unsecured data indication. The method also provides for receiving an authentication code via the first communication interface and decoding the authentication code and determining the authenticity of the data. If the authentication code fails to indicate authenticity then the data is deleted. If the authentication code indicates authenticity, then the data is transferred to a destination device via a second communication interface.

6 Claims, 3 Drawing Sheets

(56) References Cited

U.S. PATENT DOCUMENTS

| | | | |
|---|---|---|---|
| 8,756,666 B1 * | 6/2014 | Silva | G06F 21/34 713/172 |
| 2003/0203734 A1 | 10/2003 | Igloi et al. | |
| 2010/0114410 A1 | 5/2010 | Roquelaure et al. | |
| 2010/0179710 A1 | 7/2010 | Joseph | |
| 2010/0199083 A1 | 8/2010 | Genissel | |

FOREIGN PATENT DOCUMENTS

| | | |
|---|---|---|
| WO | 0008562 | 2/2000 |
| WO | 2005083970 A1 | 9/2005 |
| WO | 2007064655 A1 | 6/2007 |

OTHER PUBLICATIONS

European Patent Office, Partial European Search Report for Application No. 11 180 452.2 dated Sep. 28, 2012.

European Patent Office, "Office Action from EP Application No. 11180452.2 mailed Apr. 28, 2015", "from Foreign Counterpart of U.S. Appl. No. 12/915,769", Apr. 28, 2015, pp. 1-5, Published in: EP.

EP Search Report for Application No. 11 180 452.2 dated Feb. 6, 2013.

EP Office Action for Application No. 11 180 452.2 dated Apr. 23, 2013.

* cited by examiner

HIGH ASSURANCE AUTHORIZATION DEVICE

PRIORITY CLAIMS

This application claims the benefit of U.S. Provisional Application No. 61/381,345, filed Sep. 9, 2010.

TECHNICAL FIELD

The present invention relates to information security and, more particularly, to a High Assurance Authorization Device (HAAD) to guard against limited defined security threats.

BACKGROUND

Wireless technology can be used to transfer to an aircraft the various data bases required for aircraft functions such as navigation. An unlikely corruption of these data bases can result in a hazardous or even a catastrophic event on the aircraft. Corruption of a data base by natural effects (e.g. a bit change due to electrical noise) is well protected against by using traditional approaches such as a cyclic redundancy check. However, corruption can also be caused by malicious acts. An example is a malicious change of location of an obstacle in a chart. Protection against such "non-natural" events falls into the realm of "security" rather than information integrity. Threats to security include but are not limited to denial of service attacks, the monitoring and stealing of information and spoofing, also known as "man in the middle" intrusions.

Although inconvenient, a denial of service is not an aircraft safety issue. If the database is not loaded the pilot will not dispatch the aircraft. Similarly, misappropriation of information is a commercial issue but does not directly affect aircraft safety. For these non-safety issues, off the shelf low assurance level software provides some level of protection which may improve operations and customer satisfaction levels.

However, for the transferring of information such as databases for navigation or flight management system operating systems, corruption of a database by malicious means is a safety threat. This can be done by spoofing and/or man in the middle attacks. To protect against this intrusion, data must be verified to have originated from the authorized web site. That is, in security terms, "signed" data.

Because a data security breach can impact aircraft safety, intrusion security software needs to be developed to Considerations in Airborne Systems and Equipment Certification (CSASEC) DO178B standards or, developed using costly methods specific to Common Criteria EAL security standards. Such standards are needed to certify use of such software for aviation use by certification authorities (e.g. FAA).

Communications software packages that include multi-purpose security protection are very large and many times are available off-the-shelf without any DO178B development assurance. In some cases the communications and security software is provided on separate hardware such as personal computing devices used as electronic flight bags. However, to take advantage of the lower cost of off-the-shelf solutions yet still maintain safety/security, a method is needed to partition security software/hardware such that only that portion of the security software needed for the safety of the aircraft is developed and FAA certified by more rigorous and costly methods.

One approach to the solving the issues surrounding security functions is to use a "high design assurance" level operating system and to partition the security software into lower and higher levels of design assurance. Deos™ is an example of such an operating system. It provides high assurance level partitioning which means that low assurance level software (e.g. off-the-shelf) can run in one partition while higher assurance software can run in another, without fear of interference. However, many times the off-the-shelf software would have to be extensively re-written to operate on such an operating system which defeats the purpose of low cost acquisition of such software.

Under current aviation standards, avionics equipment and components are developed to meet a specific assurance level in a scale of design assurance levels (DAL). The scale includes DAL levels A-E that define the criticality of potential defects on flight safety. Catastrophic criticality corresponding to DAL A is the highest with "no effect" corresponding to DAL E.

Other systems that implement the security checking for wireless loading onto aircraft follow different approaches. Some systems are implemented in a DO178B design assurance level of D or E, to provide minimal assurance that the security algorithms are developed correctly. The disadvantage of this approach is that it does not address the issue of purposeful database corruption while wirelessly transferring data that require higher than level D or better software. Still other systems implement security checking that is developed to a high "Common Criteria" level, but usually these systems do not comply with DO178B.

Hence, an immediate need is for security for the transferring of navigation and other databases that require a higher assurance level for certification such as DO178B. The wireless loading of databases on business and commercial aircraft needs to be updated every few weeks. Wireless loading of databases can prevent the need for costly maintenance action that takes the aircraft out of service while the databases were being loaded.

BRIEF SUMMARY

An apparatus is provided to secure the transferring of data over the Internet from malicious interference. The apparatus comprises a computing device and a data storage device in operable communication with the computing device. The apparatus further comprises a set of high assurance security instructions resident on the data storage device and executing within the computing device and at least one input/output interface.

A method is provided for securing the transfer of data over the internet from malicious interference. The method comprises receiving data via a first communication interface and storing the data in a memory device and initiating an unsecured data indication. The method also provides for receiving an authentication code via the first communication interface and decoding the authentication code and determining the authenticity of the data. If the authentication code fails to indicate authenticity then the data is deleted. If the authentication code indicates authenticity, then the data is transferred to a destination device via a second communication interface.

A system is provided for securing the transferring of data over the internet from malicious interference. The system comprises a low security level assurance unit (LSLAU) in wireless communication with the internet. The system also includes a high assurance authorization device (HAAD) in operable communication with the LSLAU an on-board avionics data loader in operable communication with the HAAD.

BRIEF DESCRIPTION OF THE DRAWINGS

The present invention will hereinafter be described in conjunction with the following drawing figures, wherein like numerals denote like elements.

DETAILED DESCRIPTION

Figure 1:
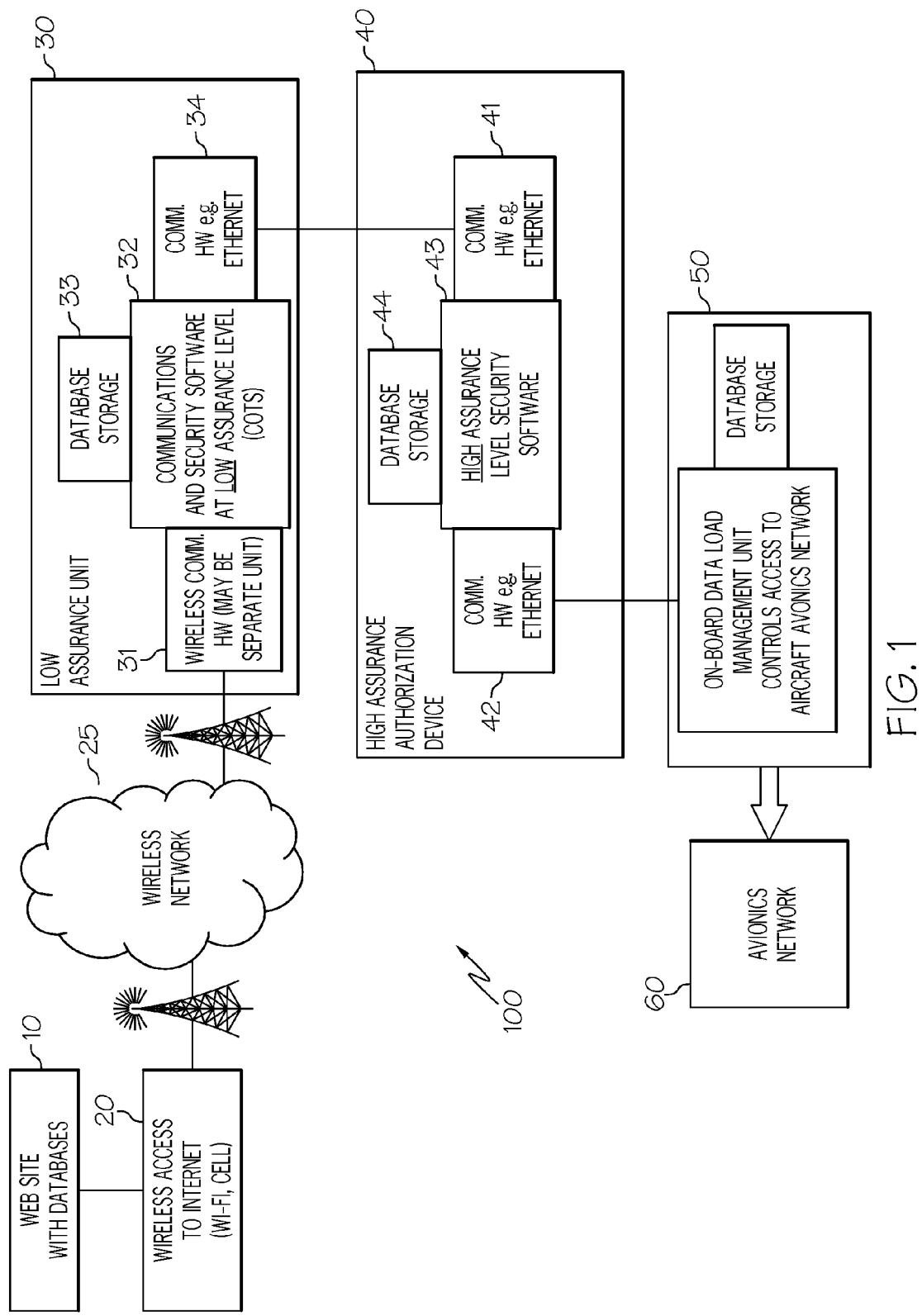
FIG. 1 is an abstract illustration of an embodiment as disclosed herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

FIG. 1 is a functional block diagram of an exemplary system 100 that may used to securely transmit data from a web site 10 to an avionics network 60 of an aircraft. At least part of the transmission may be accomplished wirelessly between two or more wireless communication systems (20, 31) via wireless network 25.

Wireless communication system 31 may be a wireless network interface (NIC) card or a gateway server that may act as the communication front end for a low security level assurance unit (LSLAU) 30. The LSLAU 30 may be any existing commercial encryption unit known in the art that contains a general purpose communications and security module (GPCEUM) 32 satisfying Software Considerations in Airborne Systems and Equipment Certification (CSASEC) DO178B with at least a Design Assurance Level (DAL) E. The GPCEUM 32 may be in operable communication with the wireless communication system 32, a database 33 and hardwired communication unit 34. The hardwired communications unit 34 may utilize any wired protocols, storage, and communication methods known in the art. Exemplary, non-limiting protocols, storage and communications methods include Ethernet, USB, SD, Canbus, Firewire, and Spacewire. In some embodiments the Ethernet protocol may be preferred.

Exemplary system 100 also features the HAAD 40. The HAAD 40 is a system designed to guard against limited defined safety threats to an aircraft that includes a wired front end communications system 41/42 (and associated digital I/O interfaces) capable of communicating with both the hardwired onboard communications unit 34 of the LSLAU 30 and an avionics data loader 50. The HAAD 40 may be hard wired to the avionics data loader 50 aboard the aircraft through which data may be loaded into the avionics network 60. An exemplary communications system/interface 41/42 may be a universal digital I/O interface such as that described in co-owned, co-pending patent application Ser. No. 12/768,448.

The HAAD 40 also includes a High Assurance Level Security Module (HALSM) 43. The HALSM 43 may be in operable communication with the wired communication system 41/42 and a database 44. The HAAD 40 may utilize any wired communications protocols known in the art. Exemplary, non-limiting protocols include Ethernet, USB, SD, Canbus, Firewire, and Spacewire. In some embodiments the HAAD 40 may utilize either or both Ethernet and USB or SD protocols.

The subject matter disclosed herein takes a different architectural approach from typical security systems in that it first identifies the security threat which threatens aircraft safety only. This safety threat is typically a subset of commercial security concerns. The approach isolates relatively simple software (e.g. a hash algorithm) from a larger security package that protects against this specific threat into a separate inexpensive processor or a memory of the HAAD 40 that lies between the LSLAU 30 and the avionics network 60. The HAAD 40 may be low cost and can be developed to higher design assurance levels to address the targeted safety threat. The HAAD may be a stand alone external module or may be a circuit card within the LSLAU 30.

Figure 2:
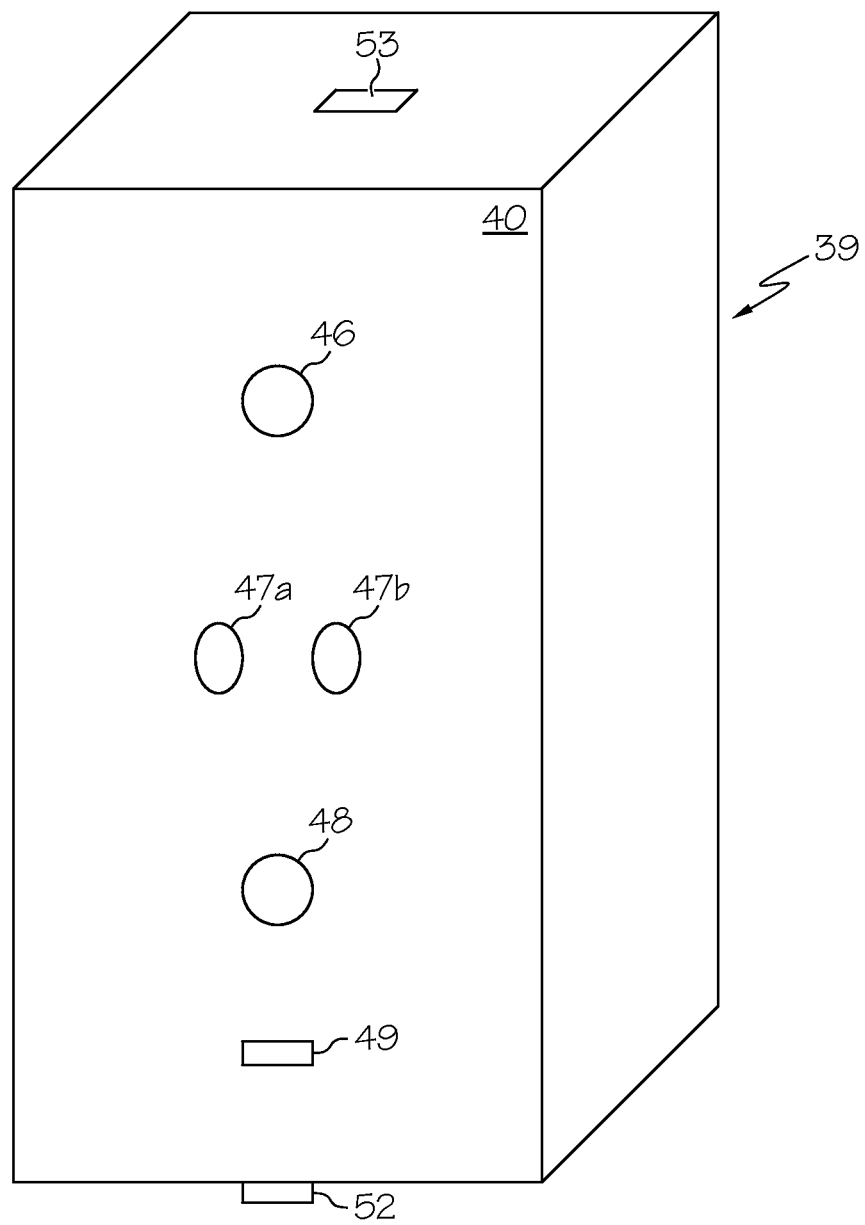
FIG. 2 is a simplified illustration of an embodiment of a HAAD device.

A non-limiting exemplary form factor for a HAAD 40 is depicted in FIG. 2. Externally, the HAAD comprises a form factor 39. The form factor 39 may be any suitable shape. In the interest of clarity and brevity, the form factor 39 will herein be assumed to be a device similar to a thumb drive or SD card with an interface 52 that may be compatible with a USB or SD port in the avionics data loader 50. The HAAD 40 may also have a port 53 configured to receive a cable from the LSLAU 30. The port 53 may be an Ethernet port.

In other embodiments, the HAAD 40 may be comprised of executable software or software objects recorded on a memory device, it may be a separate operating mode on a computing device. In equivalent embodiments the HAAD 40 may be comprised of hardware components, firmware or a combination of hardware, firmware and software.

The HAAD 40 may be connected to the LSLAU 30 via an Ethernet port 53 and to the avionics data loader 50 via the USB or SD interface 52. When a download is received by the LSLAU 30 and is ready to be transferred to the avionics data loader 50, a transducer 46 is manually manipulated. The transducer 46 may be any suitable mechanical or electrical transducer known in the art and may be located on the LSLAU 30 or on a stand alone embodiment of the HAAD 40. Should the HAAD 40 take the form of a portable computer then the transducer may be a key on the keyboard or other button or mouse control. Non-limiting examples of a transducer include a push button, a toggle switch, a sliding switch and the like.

When the transducer 46 is manipulated the data is downloaded from the LSLAU 30 to the HAAD 40 where it is determined if the downloaded data is authorized to be transferred to the avionics network 60 as will be more fully disclosed below. If the data is not authorized, a red light 47a (i.e. an unsecured indicator) may be illuminated or some other indicator triggered. However, in equivalent embodiments an unsecured indicator may be indicated by any number of indication means which may comprise an alpha-numeric character(s), graphical icon, a graphics symbol, and/or an audio alert(s).

If the data has been authorized for transferring to the avionics network 60, a green light 47b (i.e. a secured indicator) is illuminated or another indicator triggered and the red light 47a is extinguished. Once the green light is illuminated, then a transducer 48 may be manipulated to initiate the download of the authorize data to the avionics data loader 50 and from there into the avionics network 60. However, in equivalent embodiments a secured indicator may be indicated by any number of indication means which may comprise an alpha-numeric character(s), graphical icon, a graphics symbol, and/or an audio alert.

In equivalent embodiments the transducers 46 and 48 may be a single transducer. The single transducer 46/48 may operate whereby a subsequent manipulations cause the data to be received and stored and then transferred to a follow-on device. Such a device may be a physical toggle switch, a double action push switch, or a software instruction comprising executable commands to operate with a simple button.

Figure 3:
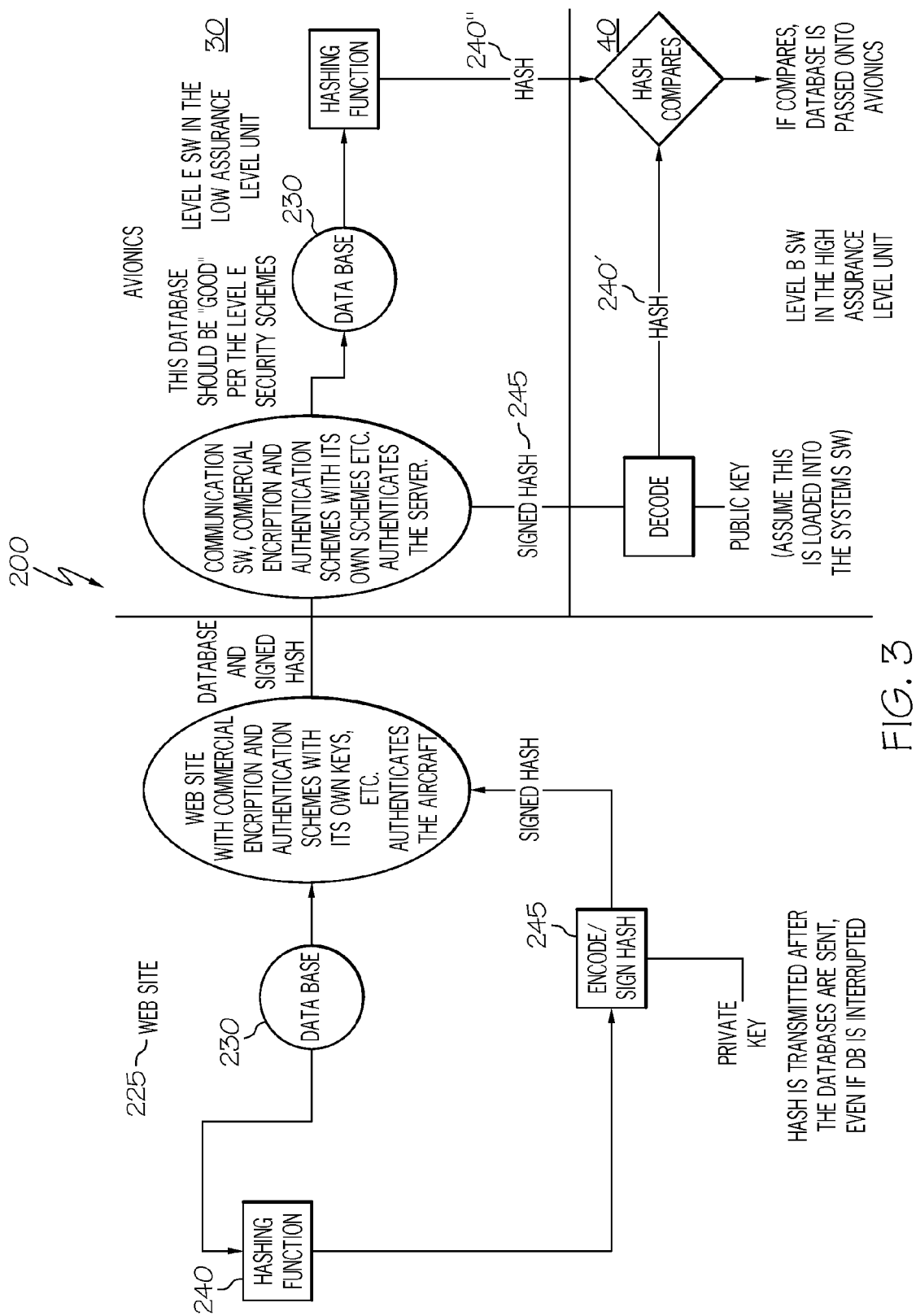
FIG. 3 is an exemplary flow diagram for an embodiment disclosed herein.

Download authorization may be accomplished using any suitable authentication procedure known in the art. FIG. 3 is a non-limiting example of an authentication procedure 200 that uses a hash function in one embodiment. A hash function is any well-defined procedure or mathematical function that converts a large, possibly variable-sized amount of data into a small datum. The values returned by a hash function are called hash values, hash codes, hash sums, checksums or simply hashes. Hashing may be accomplished by any standard cryptographic hash algorithm. As non-limiting examples, algorithms such as SHA-1 or MD5 may be used.

The authentication procedure may also use public key cryptology. Public-key cryptography is a cryptographic approach which involves the use of asymmetric key algorithms instead of, or in addition to, symmetric key algorithms. Unlike symmetric key algorithms, it does not require a secure initial exchange of one or more secret keys to both sender and receiver. The asymmetric key algorithms are used to create a mathematically related key pair: a secret private key and a published public key. Use of these keys allows protection of the authenticity of a message by creating a digital signature of a message using the private key, which can be verified using the public key. It also allows protection of the confidentiality and integrity of a message, by public key encryption, encrypting the message using the public key, which can only be decrypted using the private key. Public key cryptography is the approach which is employed by many cryptographic algorithms and cryptosystems. It underlies such Internet standards as Transport Layer Security (TLS) (successor to SSL), Pretty Good Privacy (PGP), and Gnu Privacy Guard (PGP).

In operation, a website 225 or a separate ground tool generates a hashing function 240 and a database 230 for communication to an aircraft. Before transmission, the hashing function 240 is signed by a private cryptography key 245. The database 230 and the signed hash function 245 are then communicated to the LSLAU 30 requesting the database. In some embodiments, the website 225 also may authenticate the requesting aircraft.

Upon receiving the database and the signed hash, the LSLAU 30 transmits the signed hash to the HAAD 40. The LSLAU 30 may also have a copy of the original hash function 240" loaded in memory which it also communicates to the HAAD 40 along with the data base 230. In some embodiments, the LSLAU 30 also may authenticate the sending website 225. In other embodiments the database 230 may be sent to the HAAD where the hashing function takes place.

Upon receiving the database and the signed hash, the HAAD 40 decodes the signed hash 245 using a public key and compares the decoded hash function 240' to the stored hash 240". If both hashes match then the database 230 may be loaded into the avionics network 60 by the avionics data loader 50. If the hashes do not match then the data is deleted from memory or is retained in memory as unauthenticated data.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for securing the transferring of data over the internet from malicious interference, comprising:
   a low security assurance unit (LSLAU) in wireless communication with the internet, wherein the LSLAU is configured to receive from the internet a database and a signed hash associated with the database, wherein the signed hash is an encoded form of an original hash generated from the database, and wherein the LSLAU is configured to perform a hashing function with the database to re-obtain the original hash;
   a high assurance authorization device (HAAD) in operable communication with the LSLAU, wherein the HAAD is configured to receive from the LSLAU the signed hash, the original hash and the database, wherein the HAAD is configured to decode the signed hash to obtain a decoded hash, and wherein the HAAD is configured to compare the decoded hash with the original hash; and
   an on-board avionics data loader in operable communication with the HAAD; wherein when the decoded hash matches the original hash, the HAAD is further configured to load database to an avionics network with the on-board avionics data loader.

2. The system of claim 1, wherein the LSLAU comprises:
   a wireless communication interface in operable communication with the internet;
   a first wired communication interface in operable communication with the HAAD;
   a first memory device; and
   a general purpose communications and security unit (GPCEUM) in operable communication with the wireless communication interface and the first wired communication interface; and the first memory device.

3. The system of claim 2, wherein the HAAD comprises:
   a second wired communication interface in operable communication with the HAAD;
   a third wired communication interface in operable communication with the on-board avionics data loader;
   a second memory device; and
   a high assurance level security module (HALSM) in operable communication with the second wired communication interface and the third wired communication interface.

4. The system of claim 3, wherein the GPCEUM is configured to a design assurance levels (DAL) level D or lower.

5. The system of claim 3, wherein the HAAD is designed to a DAL C or higher.

6. The system of claim 5, wherein the HALSM comprises a computing device containing executable commands that when executed perform the steps of:
   receiving data from the LSLAU via a first communication interface and storing the data in the second memory device;
   initiating an unsecured data indication;
   receiving an authentication code via the LSLAU and decoding the authentication code;
   determining the authenticity of the data;
   if the authentication code fails to indicate authenticity, then deleting the data;
   if the authentication code indicates authenticity, then transferring the data to a destination device.

* * * * *